(12) United States Patent
Deachin et al.

(10) Patent No.: US 11,827,277 B2
(45) Date of Patent: Nov. 28, 2023

(54) REINFORCEMENT WITH INTEGRATED STOP DEVICE

(71) Applicant: Zephyros, Inc., Romeo, MI (US)

(72) Inventors: Kyle Deachin, Romeo, MI (US); Eric White, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 317 days.

(21) Appl. No.: 17/298,197

(22) PCT Filed: Dec. 3, 2019

(86) PCT No.: PCT/US2019/064209
§ 371 (c)(1),
(2) Date: May 28, 2021

(87) PCT Pub. No.: WO2020/117784
PCT Pub. Date: Jun. 11, 2020

(65) Prior Publication Data
US 2022/0089224 A1    Mar. 24, 2022

Related U.S. Application Data

(60) Provisional application No. 62/774,578, filed on Dec. 3, 2018.

(51) Int. Cl.
*B62D 25/12* (2006.01)
*B62D 29/00* (2006.01)

(52) U.S. Cl.
CPC ........... *B62D 25/12* (2013.01); *B62D 29/002* (2013.01)

(58) Field of Classification Search
CPC .............................. B62D 29/002; B62D 25/12
See application file for complete search history.

(56) References Cited

U.S. PATENT DOCUMENTS

| | | |
|---|---|---|
| 5,884,960 A | 3/1999 | Wycech |
| 6,348,513 B1 | 2/2002 | Hilborn et al. |
| 6,368,438 B1 | 4/2002 | Chang et al. |
| 6,811,864 B2 | 11/2004 | Czaplicki et al. |
| 6,890,021 B2 | 5/2005 | Bock et al. |

(Continued)

FOREIGN PATENT DOCUMENTS

| | | |
|---|---|---|
| GB | 2421478 A | 6/2006 |
| WO | 2010/054194 A1 | 5/2010 |

OTHER PUBLICATIONS

PCT Search Report & Written Opinion dated Mar. 19, 2020 (Application No. PCT/US2019/064209).

(Continued)

*Primary Examiner* — Amy R Weisberg
*Assistant Examiner* — Melissa Ann Bonifazi
(74) *Attorney, Agent, or Firm* — The Dobrusin Law Firm, PC

(57) ABSTRACT

A structural reinforcement comprising a rigid polymeric structure having a longitudinal axis and including a first portion having an opening for connecting the structure to a secondary surface and a second portion including a stop device having a terminal end that extends beyond any other surface of the structure, a fastening device for locating into the opening an adhesive associated with one or more of the first and second portion, wherein at least a section of the second portion lies in a plane that is skew to a plane in which the first portion lies.

18 Claims, 2 Drawing Sheets

(56) References Cited

U.S. PATENT DOCUMENTS

| | | |
|---|---|---|
| 6,920,693 B2 | 7/2005 | Hankins et al. |
| 6,921,130 B2 | 7/2005 | Barz et al. |
| 6,932,421 B2 | 8/2005 | Barz |
| 7,125,461 B2 | 10/2006 | Czaplicki et al. |
| 7,249,415 B2 | 7/2007 | Larsen et al. |
| 8,720,975 B1 * | 5/2014 | Perez .................. B60Q 1/0495 296/187.04 |
| 2004/0025290 A1 | 2/2004 | Novarino |
| 2004/0076831 A1 | 4/2004 | Hable et al. |
| 2004/0256888 A1 | 12/2004 | Le Gall |
| 2006/0061115 A1 | 3/2006 | Brennecke |
| 2007/0080559 A1 | 4/2007 | Stolarski et al. |
| 2007/0138683 A1 | 6/2007 | Kanie |
| 2009/0091157 A1 | 4/2009 | Niezur |
| 2011/0049323 A1 | 3/2011 | Belpaire et al. |
| 2015/0266433 A1 | 9/2015 | Lupini et al. |
| 2016/0229457 A1 | 8/2016 | Boettcher |

OTHER PUBLICATIONS

India First Examination Report dated Jan. 10, 2023, Application No. 202137023867.
Chinese First Office Action & Search Report dated Dec. 12, 2022. Application No. 201980080022.4.
Chinese Second Office Action dated Apr. 26, 2023, Application No. 201980080022.4.

* cited by examiner

REINFORCEMENT WITH INTEGRATED STOP DEVICE

FIELD OF THE INVENTION

The present teachings relate generally to reinforcement of cavities, and more particularly to reinforcement of vehicle cavities using structural reinforcements with associated activatable (e.g., expandable) materials and integrally formed support structures.

BACKGROUND OF THE INVENTION

In various locations throughout transportation vehicles, recent years have seen the increased use of structural reinforcements in which vehicle cavities are commonly fitted with structural reinforcements that aid in controlling deformation from an impact. For some applications, it has become popular to employ a carrier structure in combination with a secondary material, such as an expandable adhesive material as part of the reinforcement. See e.g., U.S. Pat. Nos. 6,932,421; 6,921,130; 6,920,693; 6,890,021; and 6,467,834 all incorporated by reference herein for all purposes.

Automotive hood structures require support posts (often called bump-stops) along the sides of an engine compartment. These bump-stops are often mounted to a structural reinforcement. This mounting process requires additional fasteners and additional assembly steps for attaching the bump stops to the structural reinforcement.

Accordingly, it would be desirable to provide an integrated structural reinforcement and bump-stop to eliminate the need for additional fasteners for attaching the bump stop to the reinforcement and additional assembly steps.

SUMMARY OF THE INVENTION

The present teachings meet one or more of the above needs by the improved devices described herein.

In one aspect, the present teachings pertain to a structural reinforcement comprising a rigid polymeric structure having a longitudinal axis and including a first portion having an opening for connecting the structure to a secondary surface and a second portion including a stop device having a terminal end that extends beyond any other surface of the structure. The structural reinforcement may include a fastening device for locating into the opening and an adhesive associated with one or more of the first and second portion. At least a section of the second portion lies in a plane that is skew to a plane in which the first portion lies.

One or more wells may be formed in both the first portion and second portion. The wells may be formed by a plurality of ribs arranged in a direction that is substantially perpendicular to the longitudinal axis of the rigid polymeric structure. The reinforcement may be adapted for location in a vehicle so that the stop device contacts a metallic structure of the vehicle and the remaining reinforcement is substantially free of any contact with the metallic structure of the vehicle. The adhesive may be located in contact with the stop device. The stop device may include a cover portion and a shaft portion and a diameter of the cover portion is larger than a diameter of the shaft portion. The stop device may be removably attached to the second portion. The stop device may be integrally formed with the second portion. The stop device may be adjustable. The stop device may be fixed once attached to the second portion.

The adhesive may be activated to foam, cure, or any combination thereof. Each of the first portion and second portion may include one or more wells formed by one or more ribs. The fastening device may be separately formed from the rigid polymeric structure. The fastening device may be threaded. The fastening device may be selected from a clip, a pin, a screw, a weld, a tree-fastener, or some combination thereof. The fastening device may extend completely through the top surface and bottom surface.

The rigid polymeric structure may include a top surface and a bottom surface and the bottom surface is substantially free of any wells or ribs. The bottom surface may be substantially flat. One or more of the first portion and second portion may include a curved wall. The first portion may include a curved wall and the second portion is substantially free of any curved walls. The stop device may be a support for an automotive panel. The stop device may be a support for an automotive hood structure.

The devices disclosed herein are designed to reinforce a vehicle section while also including an integrated stop device for preventing undesirable contact between vehicle structures.

DETAILED DESCRIPTION

Figure 1:
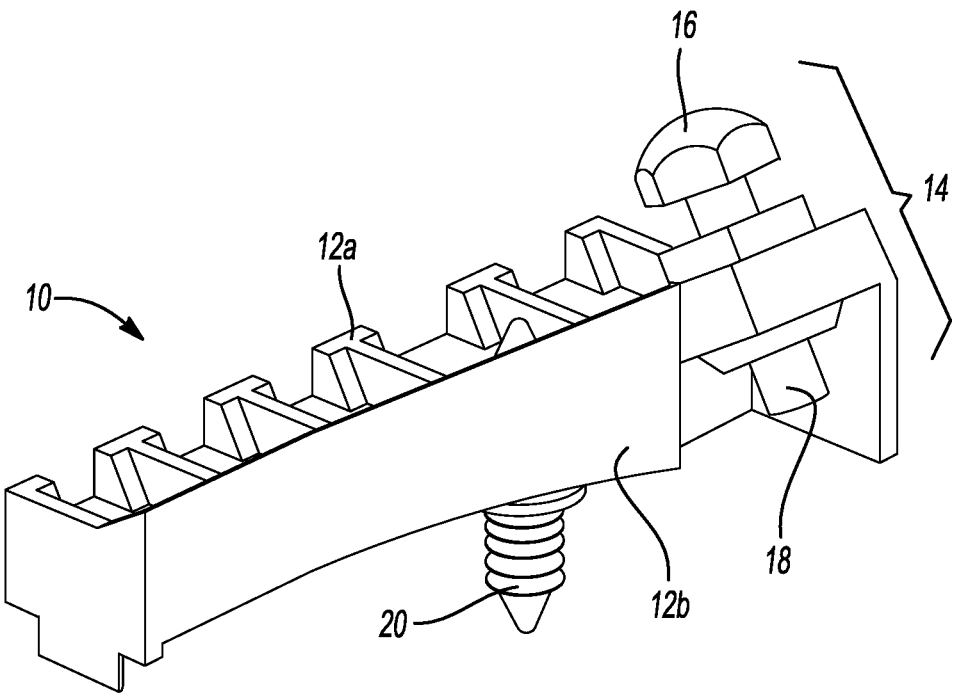
FIG. 1 is a perspective side profile view of an illustrative reinforcement in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the priority date of U.S. Provisional Application Ser. No. 62/774,578, filed Dec. 3, 2018, the contents of that application being hereby incorporated by reference herein for all purposes.

The teachings presented herein contemplate a unique approach for providing an integrated structural reinforcing device and bump stomp, so that additional fasteners are not required. The use of fasteners presents risk that at some point the fasteners may fail. As a result, a device that avoids the need for additional fasteners is desirable.

The integrated reinforcing device includes a rigid polymeric structure. The rigid polymeric structure may be formed of a moldable or extrudable material, which may be any polymeric material. The rigid polymeric structure which may comprise a polyamide material. The rigid polymeric structure may be formed by a pultrusion process. The polymeric material may be a reinforced polymeric material. For example, the polymeric material may be a fiber reinforced material. The fibers may be selected from woven fibers or non-woven fibers. The fibers may form a fiber mat. The polymeric material may be a polyurethane. The polymeric material may be a thermoset material. The polymeric material may be a thermoplastic material. The polymeric material may be a thermoplastic epoxy material. The polymeric material may be a fiber reinforced thermoplastic epoxy material. The polymeric material may form a composite (e.g., layered) structure.

The rigid polymeric structure may be formed by one or more dissimilar materials. The rigid polymeric structure may include both a molded section and a pultruded section. The rigid polymeric structure may include a first material overmolded about a second material. The rigid polymeric structure may include a pultruded section and a material overmolded about at least a portion of the pultruded section.

An optional adhesive may be located onto one or more portions of the rigid polymeric structure. The adhesive may be an activatable adhesive. The adhesive may be activated to expand, cure, or some combination thereof. The adhesive may be one or some combination of an adhesive, reinforcing and/or sealant material. The adhesive may be a material that experiences expansion and/or cure upon exposure to temperatures of between about 148.89° C. to about 204.44° C. (about 300° F. to about 400° F.) (i.e., temperatures typically experienced in automotive painting or coating operations). The adhesive may be a room temperature cure adhesive. The adhesive may be a 2-part adhesive that cures upon contact between the two parts or after some desired open time. The adhesive may be foamed (e.g., expanded) to a volume of at least 5% greater, at least 50% greater, at least 200% greater, at least 1000% greater, at least 2000% greater, at least 5000% greater or higher relative to the original unexpanded (e.g., green state) volume. The adhesive may be substantially free of any foaming.

The adhesive material may be an epoxy-based material such as those disclosed in U.S. Pat. Nos. 5,884,960; 6,348,513; 6,368,438; 6,811,864; 7,125,461; 7,249,415; and U.S. Patent Publication No. 2004/0076831, hereby incorporated by reference herein for all purposes.

The integrated reinforcing device described herein may be formed with one or more well structures. The one or more well structures may be formed by a plurality of ribs running perpendicular to the longitudinal axis of the part. The one or more well structures may be formed by a plurality of ribs running parallel to the longitudinal axis of the part. The one or more well structures may be formed by a plurality of ribs running both perpendicular to and parallel to the longitudinal axis of the part. Each well may include a base wall arranged perpendicularly to one or more ribs for forming a floor of the well. The part may include at least two wells, at least three wells, at least four wells, or even at least five wells. One or more wells may include the adhesive material. One or more wells may be substantially free of any adhesive material.

The integrated reinforcement device may include a plurality of rib structures. More specifically, certain sections of the device may include ribs on only a single surface (e.g., on only the top surface or only the bottom surface). Certain portions of the device may be substantially flat and substantially free of any rib structures. As one example, a first surface may be formed to include a plurality of rib structures while a second surface that substantially opposes the first surface may be flat and free of any rib structures. The reinforcement device may include at least two surfaces that are substantially free of any rib structures. The reinforcement device may include at least three surfaces that are substantially free of any rib structures.

The reinforcement device may be connected to or even integrally formed with a secondary component of the vehicle. The secondary component may be a support structure. The support structure may support one or more panel sections of the vehicle. The support structure may support a door panel, a hood panel, a roof panel, or a trunk panel. The support structure may be a stop device. The support structure may a bumper stop device.

It is also possible that the adhesive material may be located onto only select surfaces of the device. For example, the adhesive material may be located onto a top or bottom surface of a portion of the device. It is possible that the adhesive material be located onto surfaces of the portions that do not carry any rib structures.

The arrangement of the ribs, the location of the well structures, the location of the adhesive material or some combination of these variables, provides a device where selected portions of the device are less likely to buckle and/or crack. As an example, the location of a well structure may prevent a crack from travelling from a first portion of the device to a second portion of the device.

The integrated reinforcement device may include a fastener for connecting the device to a vehicle cavity so that the stop device contacts a secondary structure of the vehicle. The fastener may be any fastening device or adhesive capable of connecting the integrated reinforcement device to a vehicle structure. It may be a screw, a tree fastener, a fiction fit fastener, a pin, or some combination thereof. The fastener may be an adhesive which may be applied as a film, a paste or may be extruded or molded onto the reinforcement device.

It is also possible that a variety of existing vehicle devices be integrated with a reinforcing structure. Such integration may minimize installation steps, minimize the need for additional fasteners and may assist in stabilizing and/or protecting the vehicle device from damage during any accident or other event that could damage a vehicle. The integrated reinforcement device may include an opening for receiving an integrated vehicle device. The integrated vehicle device may be integrally molded, extruded, or pultruded with the rigid polymeric structure.

The stop device may include a cover portion and a shaft portion. The cover portion may have a diameter that is at least twice as large, at least three times as large or even at least four times as large as the diameter of the shaft portion.

Figure 2:
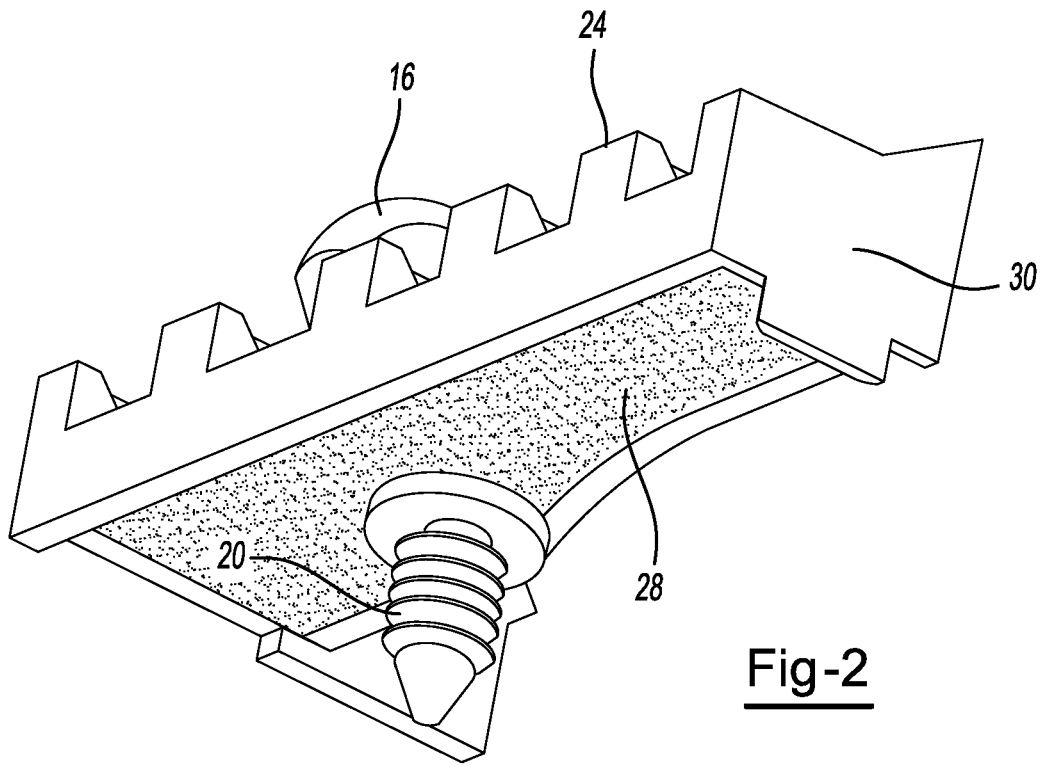
FIG. 2 is a perspective bottom view of the reinforcement of FIG. 1.
Figure 3:
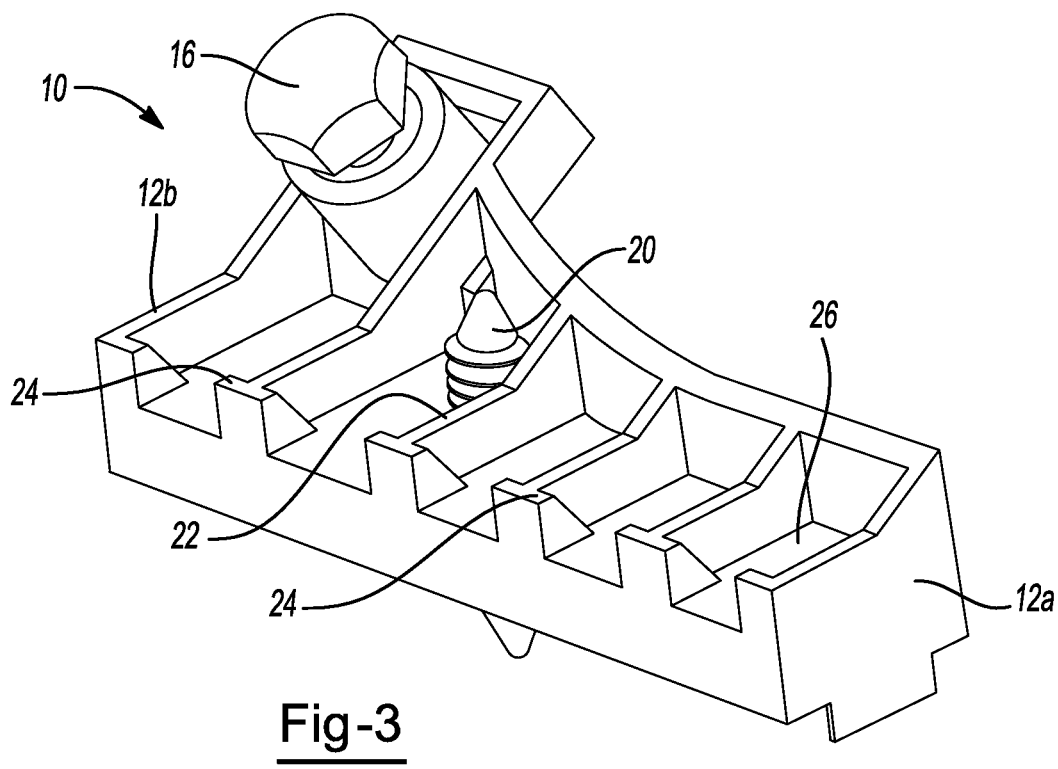
FIG. 3 is a perspective top view of the reinforcement of FIG. 1.
Figure 4:
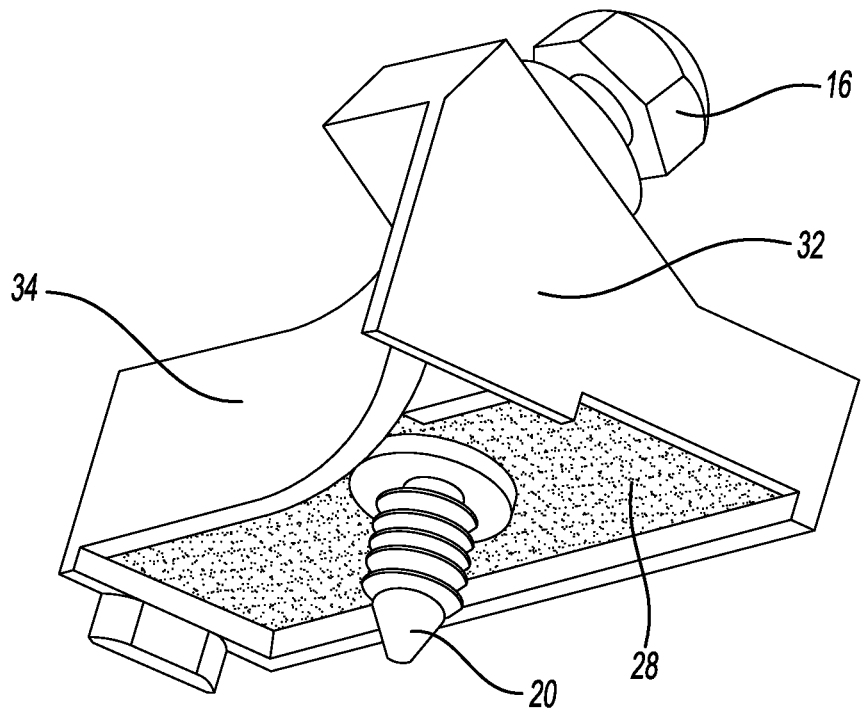
FIG. 4 is a perspective bottom view of the reinforcement of FIG. 1.

As shown for example in FIGS. 1-4, the reinforcement structure 10 is shown having a rigid polymeric structure 12 including a first portion 12a, and a second portion 12b. The second portion includes a stop device 14 including a cover portion 16 and a shaft portion 18. A fastening device 20 is adapted for attaching the reinforcement structure to a secondary surface (not shown). The polymeric structure 12 includes a plurality of perpendicular ribs 22 that lie in a direction perpendicular to the longitudinal axis of the polymeric structure 12 and a plurality of parallel ribs 24 that lie in a direction parallel to the longitudinal axis of the polymeric structure 12. These ribs form a plurality of wells 26 along the polymeric structure 12.

The rigid polymeric structure 12 includes a first substantially flat surface 28 that opposes a surface that includes the perpendicular and parallel ribs 22, 24. The rigid polymeric structure 12 includes a second substantially flat surface 32 that lies in a substantially perpendicular arrangement with the first flat surface 28. The rigid polymeric structure 12 includes a curved surface 34 that that lies in a substantially perpendicular arrangement with the first flat surface 28.

The rigid polymeric structure may be formed by an injection molding step. An adhesive material may be applied to the rigid polymeric structure by a second molding process (e.g., a two-shot molding process) whereby the adhesive material is injection molded onto the base reinforcing structure. The rigid polymeric structure may be formed by an extrusion or pultrusion step. The adhesive may be applied as part of an in-line application process. The adhesive may extruded onto the polymeric structure with a mini-applicator (mini extrusion device).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural reinforcement comprising:
   i) a rigid polymeric structure having a longitudinal axis and including a first portion having an opening for connecting the structure to a secondary surface and a second portion including a stop device having a terminal end that extends beyond any other surface of the structure;
   ii) a fastening device for locating into the opening;
   iii) an adhesive associated with one or more of the first and second portion;
   wherein at least a section of the second portion lies in a plane that is skew to a plane in which the first portion lies and further wherein the adhesive is located in contact with the stop device.

2. The structural reinforcement of claim 1, including one or more wells formed in both the first portion and second portion.

3. The structural reinforcement of claim 2, wherein the wells are formed by a plurality of ribs arranged in a direction that is substantially perpendicular to the longitudinal axis of the rigid polymeric structure.

4. The structural reinforcement of claim 1, wherein the reinforcement is adapted for location in a vehicle so that the stop device contacts a metallic structure of the vehicle and the remaining reinforcement is substantially free of any contact with the metallic structure of the vehicle.

5. The structural reinforcement of claim 1, wherein the stop device includes a cover portion and a shaft portion and a diameter of the cover portion is larger than a diameter of the shaft portion.

6. The structural reinforcement of claim 1, wherein the stop device is removably attached to the second portion.

7. The structural reinforcement of claim 1, wherein the stop device is integrally formed with the second portion.

8. The structural reinforcement of claim 5, wherein the stop device is adjustable.

9. The structural reinforcement of claim 2, wherein the stop device is fixed once attached to the second portion.

10. The structural reinforcement of claim 1, wherein the adhesive is activated to foam, cure, or any combination thereof.

11. The structural reinforcement of claim 2, wherein each of the first portion and second portion include one or more wells formed by one or more ribs.

12. The structural reinforcement of claim 1, wherein the fastening device is separately formed from the rigid polymeric structure.

13. The structural reinforcement of claim 12, wherein the fastening device is threaded.

14. The structural reinforcement of claim 1, wherein the fastening device is selected from a clip, a pin, a screw, a weld, a tree-fastener, or some combination thereof.

15. The structural reinforcement of claim 1, wherein the rigid polymeric structure includes a top surface and a bottom surface and the bottom surface is substantially free of any wells or ribs.

16. The structural reinforcement of claim 1, wherein the first portion includes a curved wall and the second portion is substantially free of any curved walls.

17. The structural reinforcement of claim 1, wherein the stop device is a support for an automotive hood structure.

18. A structural reinforcement comprising:
   i) a rigid polymeric structure having a longitudinal axis and including a first portion having an opening for connecting the structure to a secondary surface and a second portion including a stop device having a terminal end that extends beyond any other surface of the structure;
   ii) a fastening device for locating into the opening;
   iii) an adhesive associated with one or more of the first and second portion; wherein at least a section of the second portion lies in a plane that is skew to a plane in which the first portion lies wherein the rigid polymeric structure includes a top surface and a bottom surface and the bottom surface is substantially free of any wells or ribs and wherein the bottom surface is substantially flat and further wherein the fastening device extends completely through the top surface and bottom surface.

\* \* \* \* \*